United States Patent [19]

Shiozawa

[11] Patent Number: 5,692,728
[45] Date of Patent: Dec. 2, 1997

[54] SUPPORTING DEVICE HAVING ELASTIC MEMBERS WITH OSCILLATION MECHANISMS

[75] Inventor: Hisashi Shiozawa, Yokohama, Japan

[73] Assignee: Nikon Corporation, Tokyo, Japan

[21] Appl. No.: 634,176

[22] Filed: Apr. 18, 1996

[30] Foreign Application Priority Data

Jun. 19, 1995 [JP] Japan .................................. 7-151891

[51] Int. Cl.⁶ .................................................. F16M 13/00
[52] U.S. Cl. .......................... 248/618; 248/562; 248/636; 248/638; 267/140.11
[58] Field of Search ..................... 248/618, 676, 248/678, 638, 562, 636; 267/152, 153, 140.11

[56] References Cited

U.S. PATENT DOCUMENTS

| | | | |
|---|---|---|---|
| 1,921,028 | 8/1933 | Glascock | 248/618 X |
| 2,148,937 | 2/1939 | Gerb | 248/562 X |
| 3,542,322 | 11/1970 | Dvorin | 267/153 X |
| 3,690,607 | 9/1972 | Mard | 248/638 X |
| 3,727,870 | 4/1973 | Bass | 248/618 |
| 3,952,980 | 4/1976 | Von Pragenau et al. | 248/636 |
| 4,336,917 | 6/1982 | Phillips | 248/562 X |
| 4,643,385 | 2/1987 | Sandercock | 248/562 X |
| 4,738,436 | 4/1988 | Loggers | 267/152 X |
| 5,280,889 | 1/1994 | Amil et al. | 248/618 X |
| 5,286,013 | 2/1994 | Seymour et al. | 248/562 X |

*Primary Examiner*—Ramon O. Ramirez
*Assistant Examiner*—Stephen S. Wentsler
*Attorney, Agent, or Firm*—Shapiro and Shapiro

[57] ABSTRACT

A supporting mechanism is provided in which each of three supporting portions is constituted by an elastic member able to be deformed only in one direction and an oscillation mechanism which can oscillate around the axis parallel to the one direction.

4 Claims, 7 Drawing Sheets

SUPPORTING DEVICE HAVING ELASTIC MEMBERS WITH OSCILLATION MECHANISMS

BACKGROUND OF THE INVENTION

1. Field of the Invention

The present invention relates to a finishing machine or a measuring machine for which a high-precision machining or measurement is required, and particularly, to a supporting mechanism which supports a work piece or an object to be measured in the finishing or measuring machine so as to avoid deformation in such work piece or object.

2. Related Background Art

Conventionally, in order to avoid deformation of the supported object to be measured, machined or processed, a supporting mechanism utilized, for example, three steel balls. FIG. 1 shows an example of this conventional art. In this conventional example, since three supported points are three steel balls 1, it is possible to set up a structural member 3 for attaching a workpiece which is corresponding to the object to be measured, machined or processed without the influence of the flatness of a supporting member 2 on which the steel balls 1 are arranged. There is another advantage that the structural member 3 can be easily reset on the same position once it has been removed.

However, the prior art mentioned above has drawbacks which will be described below. First, a part for supporting the structural member 3 is a spherical surface so that a contacting area for supporting the weight of a workpiece is small. For this reason, the stress applied to the steel ball 1 becomes very large so that a workpiece having a large weight cannot be supported. Secondly, it is required to fix the steel balls 1 to the structural member 3 so as to avoid displacement between the structural member 3 and each of the steel balls 1. For this reason, a free rotation of the steel ball 1 is inhibited, and when the supporting member 2 is deformed during the measurement, the machining or the processing, such deformation is conveyed to the structural member 3.

One of the causes for the deformation of the supporting member 2 is thermal deformation based on a change in temperature of the measurement environment. Another cause is that when the measurement, machining or processing is conducted by moving the supporting member 2 along a guide 4, the guide 4 is deformed and this deformation causes deformation of the supporting member 2 along the deformation of the guide 4.

In order to solve the above-mentioned problems of the prior art, the steel balls 1 are replaced with elastic members each in the form of a leaf spring in one example of the supporting mechanism according to the prior art. In this conventional example, as shown in FIG. 2, a leaf spring 5 which is arranged to be rigid in one direction and flexible in a direction perpendicular thereto is provided instead of the above-mentioned steel ball 1.

According to the structure of this conventional example, it is possible to realize an effect corresponding to a rolling of the above-mentioned steel ball by permitting deformation in a flexible direction. For this reason, it can be made difficult to convey the deformation of the supporting member 2 to the workpiece. Also, since a cross sectional area of the leaf spring 5 is much larger than the contact area of the steel ball 1, it is possible to eliminate the limitations on the weight of the work.

The influence of the deformation of the supporting member 2 can be reduced in the conventional example using the leaf spring 5, compared with the prior art using the steel ball 1. However, when deformation is generated in the supporting member 2 in a direction indicated, for example, in FIG. 3A, or when a twisted deformation is generated in the supporting member 2, it is impossible to completely prevent such deformation from being conveyed to the structural member 3.

The reason therefor is that in the case of such deformation a moment is generated in a rigid direction 101 of the leaf spring 5 (see FIG. 3B), which moment brings about a deformation of the structural member 3. It is noted that the referential numeral 102 in FIG. 3B denotes a flexible direction of the leaf spring 5.

Moreover, use of an elastic member such as the leaf spring 5 for supporting may bring about harmful vibration, depending on the weight of the work and the spring constant of the leaf spring 5.

SUMMARY OF THE INVENTION

The present invention is to provide means for solving the above-mentioned problems of the prior art, and an object of the invention provides a supporting mechanism which does not convey a deformation of a supporting member to a structural member containing an object to be processed or machined or an object to be measured.

Further, another object of the present invention is to provide a supporting mechanism which can reduce a harmful vibration in the supporting mechanism without causing deterioration in the rigidity.

In order to achieve the above objects, the supporting mechanism according to the present invention comprises at least three supporting portions for supporting the object, and a supporting member to which at least three supporting portions mentioned above are fixed. Each of the supporting portions comprises an installing portion onto which the object is installed, a fixing portion for fixing the supporting portion to the supporting member, and an elastic member provided between the installing portion and the fixing portion for connecting these portions and having an elastic structure which is able to be deformed in one direction on the plane perpendicular to the direction of a load of the object applied onto the supporting portion, and each of the supporting portions further comprises an oscillation mechanism for supporting the installing portion to allow oscillation thereof with a direction parallel to the direction in which the elastic member is able to be deformed as the axial direction.

Further, the supporting mechanism according to the present invention is characterized in that a damping mechanism is added to each of the supporting portions according to the above-mentioned invention.

According to the present invention, when neither a twist nor bend is generated in the supporting member and only the positional relationship for the supporting positions is changed, the elastic member is bent in the direction in which the elastic member is able to be deformed (the flexible direction) so that the positional relationship is absorbed, and no deformation is given to the supported object.

On the other hand, when a bent deformation is generated in the supporting member, a moment which brings about a deformation of the supporting member along a direction perpendicular to the direction in which the elastic member is able to be deformed (the rigid direction). However, it is possible substantially to eliminate this moment with oscillation of the oscillation mechanism.

Also, when vibration is generated in the supported object, a positional change is generated between the object and the supporting member. Then, this vibration can be attenuated by providing a damping mechanism in each of the supporting portions.

As the damping mechanism, a material having large internal attenuation and viscosity such as grease, silicon oil or rubber is filled in a gap which is integrally formed with the supporting portions deformed by vibration. The vibration is absorbed by a shearing stress generated in the gap.

DESCRIPTION OF THE PREFERRED EMBODIMENTS

An embodiment of a supporting mechanism to which the present invention is applied will be described with reference to FIGS. 4A and 4B. This embodiment is illustrative of a basic structure of the present invention.

Figure 4A:
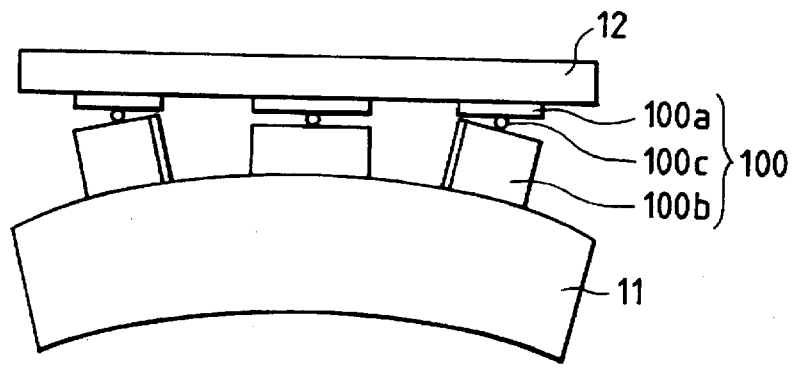
FIG. 4A is a lateral view for showing a structure of one embodiment of the present invention.
Figure 4B:
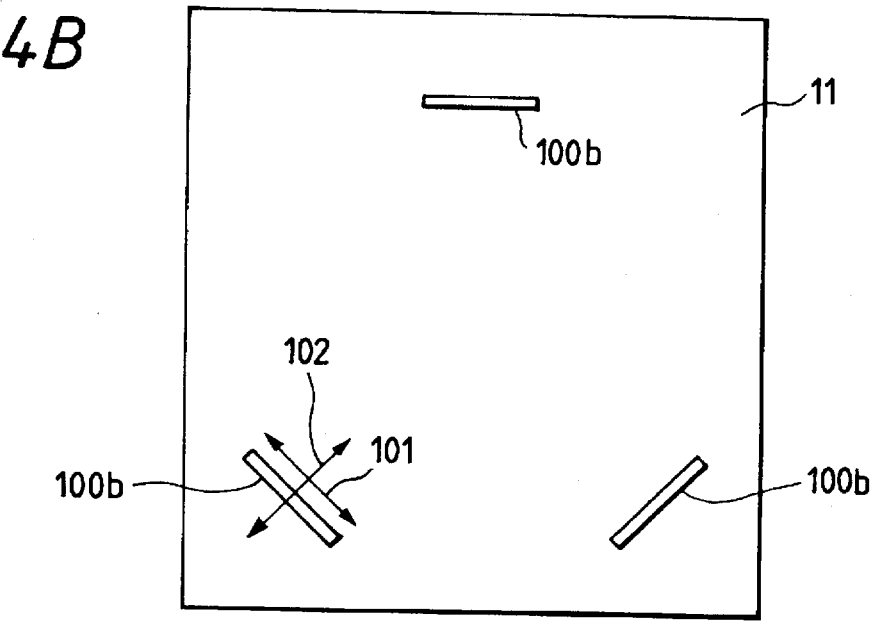
FIG. 4B is a top view for showing an arrangement of the leaf spring portion according to the embodiment of the present invention.

The supporting mechanism in the present embodiment has, as shown in FIGS. 4A and 4B, a supporting member 11 and three supporting portions 100 for supporting an object to be supported. The three supporting portions 100 are arranged and fixed onto predetermined positions on the surface of the supporting member 11.

In the following description, a structural member 12 for installing a workpiece which is corresponding to an object to be measured, processed or machined will be used as an object to be supported. However, what can be supported in the present invention is not limited to this. An object to be measured or processed may be directly supported.

The supporting portion 100 comprises an installing portion 100a to which the structural member 12 to be supported is installed, a leaf spring portion 100b fixed on the surface of the supporting member 11 and provided with an elastic structure for easily undergoing one-directional deformation, and an oscillation mechanism 100c provided between the leaf spring portion 100b and the installing portion 100a for supporting the installing portion 100a to allow oscillation thereof, using a direction substantially parallel to the flexible direction of the leaf spring portion 100b as the axial direction.

Though the leaf spring portion 100b is usually made of metal, it is possible to realize it with rubber or plastic material. In the present embodiment, the direction in the leaf spring portion 100b in which it is able to be deformed is called the flexible direction (the direction 102), and a direction perpendicular to the flexible direction is called the rigid direction (the direction 101).

In the present embodiment when a twist or bend is not generated in the supporting member 11 and only the positional relationship of the supporting positions is changed, the leaf spring portion 100b is bent in the flexible direction so that the positional change is absorbed and no deformation is given to the structural member 12.

On the other hand, even when a bent deformation as shown in FIG. 4A is generated in the supporting member 11, the deformation of the supporting member 11 is not conveyed to the structural member 12 as a moment is let to go in a portion of the oscillation mechanism 100c. In this case, it is preferable that the axial direction of the oscillation mechanism 100c is a direction parallel to the flexible direction of the leaf spring portion 100b. This is because there is generated a moment which brings about a deformation of the supporting member 11 along the rigid direction 101 of the leaf spring portion 100b.

Also, when the flexible direction of the leaf spring portion 100b is not made sufficiently flexible, or when the deformation of the structural member 12 is further reduced, it is possible to provide another oscillation mechanism which has the same structure as that of the oscillation mechanism 100c, also in the direction 102 perpendicular to the rigid direction of the leaf spring 100b. Such structure which allows oscillation in two directions perpendicular to each other will be explained by way of an embodiment to be described later.

In order to realize the oscillation mechanism 100c, a thin layer portion is provided on the top portion of the leaf spring portion 100b by using, for example, a wire-electrical discharge machining, and the oscillation mechanism 100c can be realized by the elastic deformation in that thin layer portion. In this manner, the leaf spring portion 100b and the oscillation mechanism 100c can be formed integrally. As a result, the oscillation mechanism 100c can be provided without reducing the rigidity of the leaf spring portion 100b in the rigid direction thereof.

It is preferable to install the leaf spring portion 100b in such a manner that the flexible direction 102 of each leaf spring portion 100b is toward the inside of a triangle which connects the installing positions of the respective leaf spring portions 100b. When the leaf spring portion is installed to turn toward the outside of the triangle, the rigidity against a rotatory force which acts on the structural member 12 becomes very low.

When a vibration is generated in the structural member 12, a positional change occurs between the structural member 12 and the supporting member 11 so as to deform the supporting portion 100 to generate vibration. Then, it becomes possible to attenuate this vibration by providing a damping mechanism in the supporting portion 100 of the present embodiment. A structural example of the supporting portion 100 provided with the damping mechanism will be fully explained by way of an embodiment to be described later.

Figure 1:
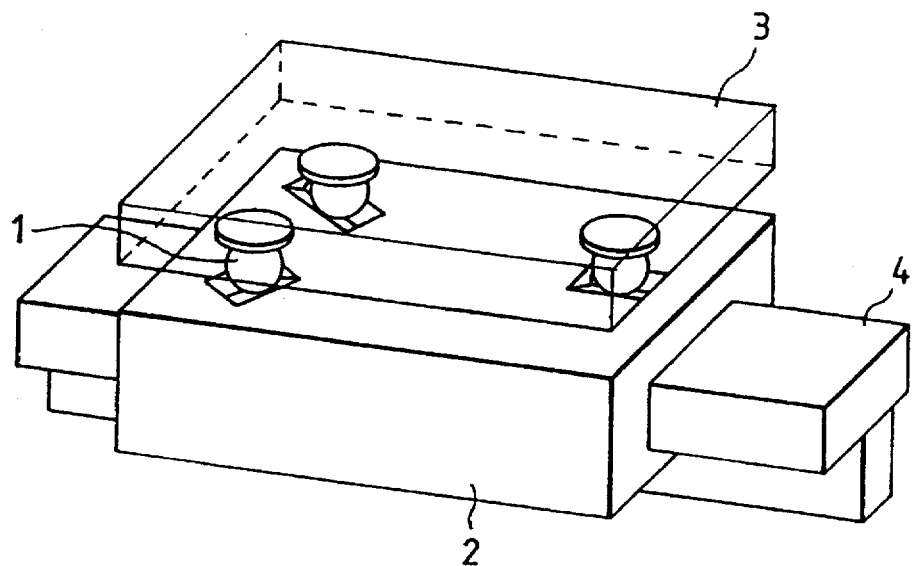
FIG. 1 is a perspective view for showing a structural example of a conventional supporting mechanism.
Figure 2:
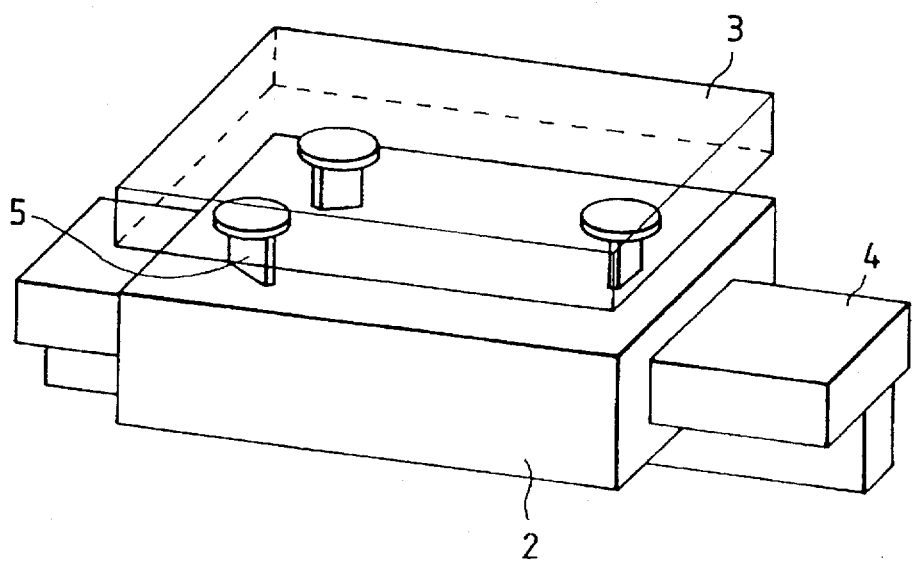
FIG. 2 is a perspective view for showing another structural example of the conventional supporting mechanism.
Figure 3A:
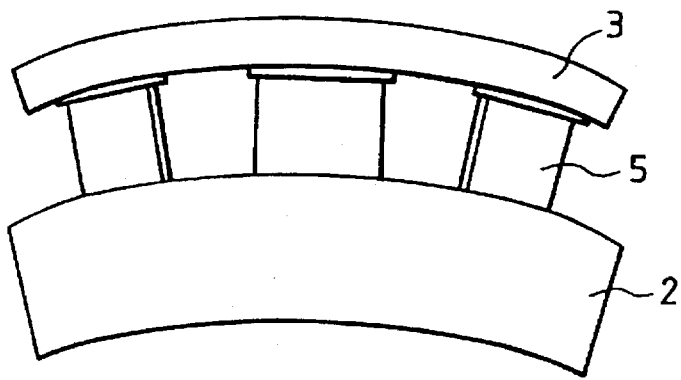
FIG. 3A is a lateral view for showing a structure of the conventional example of FIG. 2.
Figure 3B:
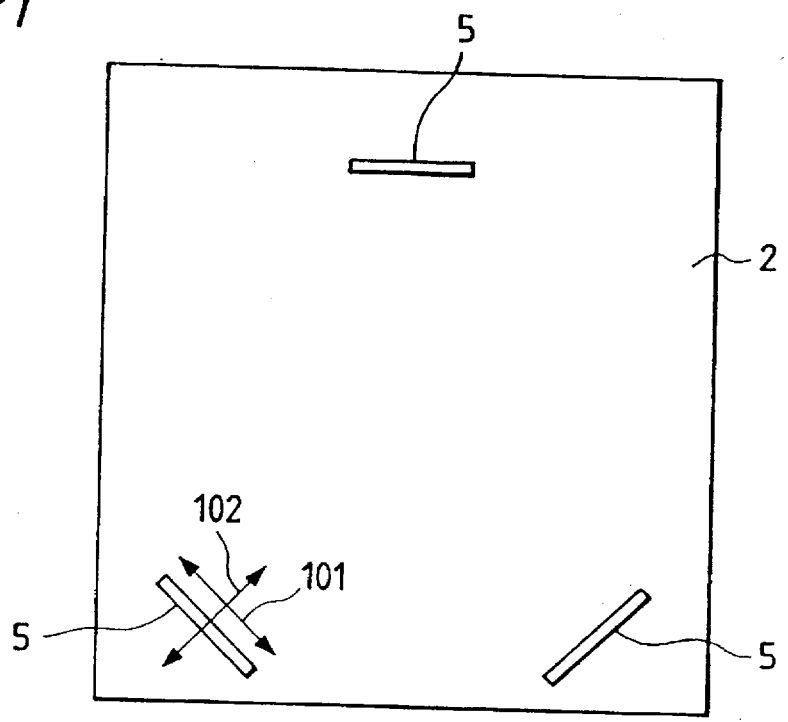
FIG. 3B is a top view for showing an arrangement of a leaf spring portion in the conventional example of FIG. 2.

In the present embodiment, a guide may be provided as shown in the conventional example of FIG. 2 so that the supporting member 11 may move along the guide.

According to this embodiment, the structural member 12 can be stably supported without conveying the deformation of the supporting member 11 to the structural member 12.

Next, another embodiment of the supporting mechanism to which the present invention is applied will be described with reference to FIGS. 5, 6, 7 and 8. The basic structure of this embodiment is the same as that of the foregoing embodiment in FIGS. 4A and 4B. Arrangements different from those in the foregoing embodiment of FIGS. 4A and 4B will be explained below. The identical portions to those in FIGS. 4A and 4B have the same reference numerals and detailed description thereof will be omitted.

Figure 5:
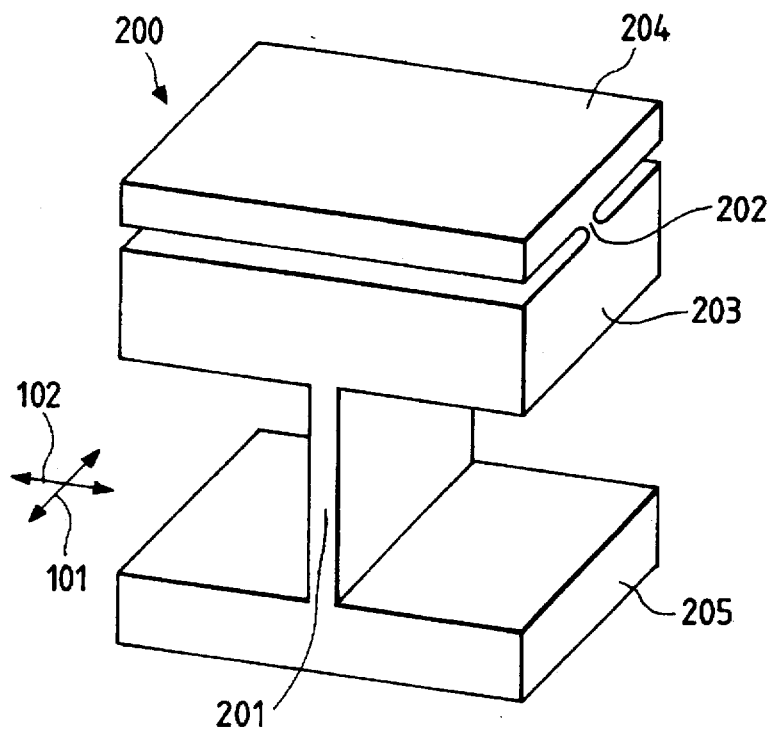
FIG. 5 is a perspective view for showing an example of a structure of the supporting portion according to another embodiment of the present invention.

In a supporting portion 200 in this embodiment, a leaf spring portion 201, an elastic hinge portion 202, a hinge installing portion 203, a structural member installing portion 204 and a supporting member installing portion 205 are integrally formed, as shown in FIG. 5.

The structural member (not shown) is fixed to the structural member installing portion 204, and the supporting member installing portion 205 is fixed to the supporting member 11.

The elastic hinge portion 202 which realizes the above-mentioned oscillation mechanism is constituted by forming a thin layer portion linearly extending along the flexible direction 102, for example, in a portion of an upper part (a part between the structural member installing portion 204 and the hinge installing portion 203) of the leaf spring portion 201 by the wire-electrical discharge machining, and by utilizing the elastic deformation in the thin layer portion, whereby the oscillation mechanism can oscillate in the rigid direction of the leaf spring portion 201. The elastic hinge portion 202 is arranged on the plate-like hinge installing portion 203 which is provided on the upper portion of the leaf spring portion 201 in such manner that the axial direction thereof is parallel to the flexible direction 102.

Each component of the supporting portion 200 in the present embodiment can be easily processed if using the wire-electrical discharge machining or an ordinary milling processing so as to constitute the supporting portion 200.

Figure 6:
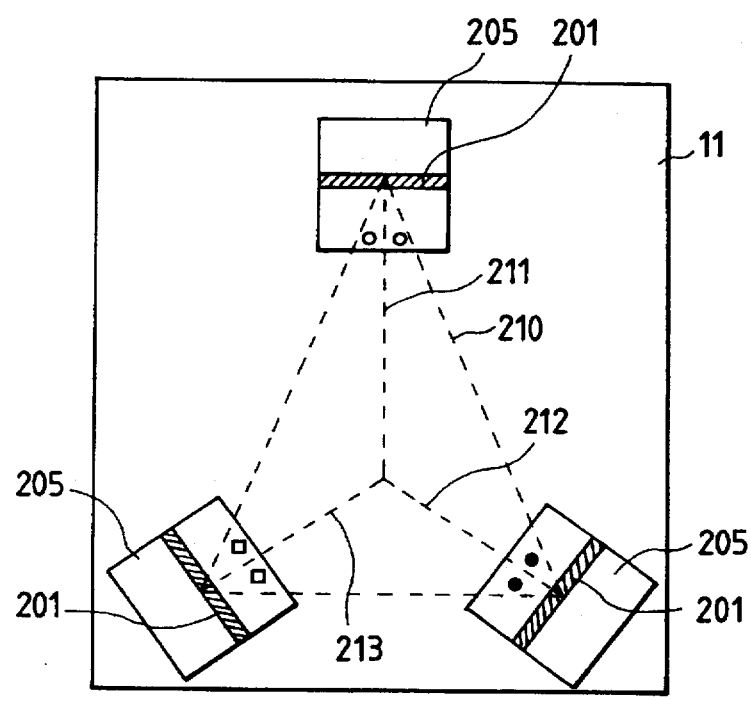
FIG. 6 is a top view showing an arrangement of the leaf spring portion in the embodiment of FIG. 5.

The three supporting portions 200 of this embodiment are arranged on the supporting member 11, as shown in FIG. 6. Note that FIG. 6 only shows the leaf spring portion 201 of each supporting portion 200 and the supporting member installing portion 205.

More specifically, each supporting portion 200 is installed in such manner that the flexible direction of the leaf spring portion 201 of each supporting portion is oriented toward the direction 211, 212 or 213 which divides each of the vertex angles of a triangle 210 for connecting the three supporting portions 200 into two equal parts. In this manner, satisfactory rigidity of the structural member on the installing surface of the supporting portion 200 can be obtained in the front and rear directions, the right and left directions, and the rotatory direction in a well-balanced manner.

The rigidity of the leaf spring portion 201 can give a smaller deformation to the structural member when the rigidity is weaker in the flexible direction. Also, with stronger rigidity in the rigid direction, more improved rigidity on the installing plane of the whole structural member is obtained. However, attention should be given to a risk that a buckling may occur when the leaf thickness of the leaf spring portion 201 is thinned to the extreme and the height thereof is increased in order to soften the rigidity in the flexible direction.

In the structure of the supporting portion 200 in this embodiment, if the width of the leaf spring portion 201 is extremely increased, the leaf spring portion 201 itself is influenced by the deformation of the supporting member 11. For this reason, it is required to properly determine the thickness, width and height of the leaf spring portion 201 in accordance with the rigidity required for supporting the structural member.

According to the arrangement of the supporting portions 200 in the present embodiment, it is possible to obtain well-balanced rigidity of the structural member on the installing plane of the supporting portion 200 in the front and rear directions, the right and left directions, and the rotatory direction.

Figure 7:
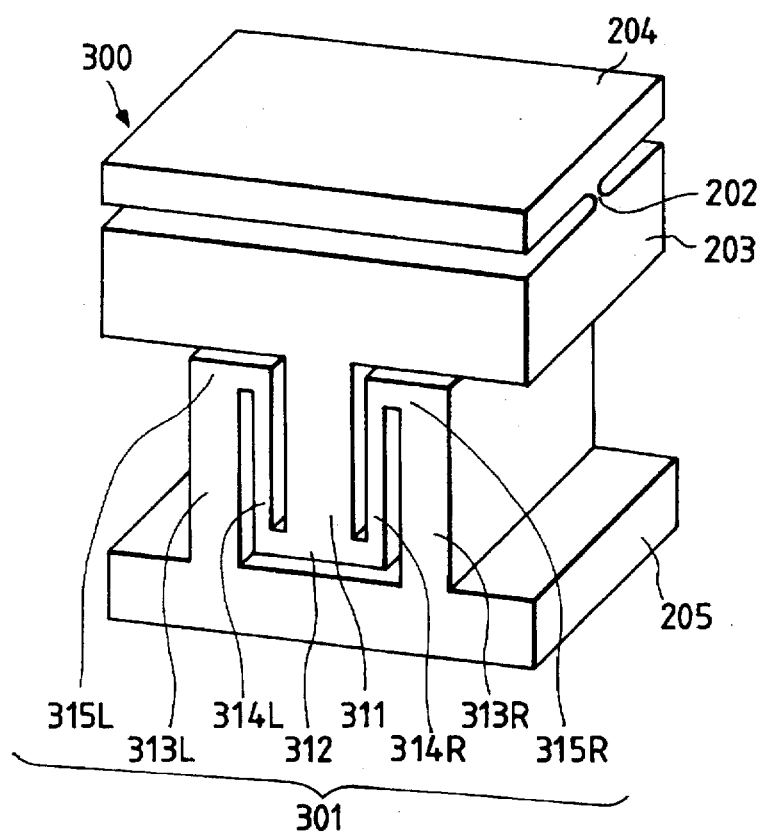
FIG. 7 is a perspective view showing another structural example of the supporting portion in the embodiment of FIG. 5.

Also, the supporting portion 200 may be arranged in the structure as shown in FIG. 7 so as to reduce the risk of the above-mentioned buckling, instead of the structure shown in FIG. 5. That is, the leaf spring portion 301 of the supporting portion 300 may be constituted, as shown in FIG. 7, by a central leaf spring portion 311 which extends from the central portion of the hinge installing portion 203 downward and right and left lapel portions which support the lower end portion 312 of the central leaf spring portion 311 in such manner that the lower end portion 312 is suspended from both ends of the central leaf spring portion.

The right lapel portion consists of a first leaf member 313R which extends from the supporting member installing portion 205 upward, a second leaf member 314R which is connected to the lower end portion 312 of the central leaf spring portion 311, and a connection member 315R which connects the first leaf member 313R and the second leaf member 314R at the upper end of the first leaf member 313R. The left lapel portion consists of a first leaf member 313L, a second leaf member 314L and a connection member 315L, in the same manner.

According to the structure of the supporting portion 300 shown in FIG. 7, a load of the supported structural member which acts on the supporting portion 300 works in the direction to pull each component of the leaf spring portion 301 so that there arises no risk of buckling even if the rigidity in the flexible direction is softened.

Figure 8:
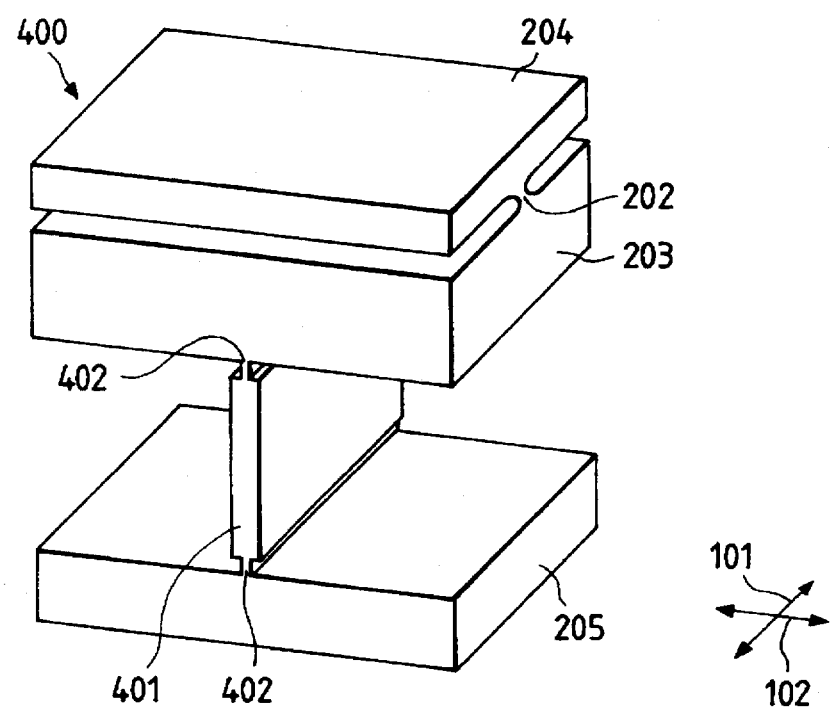
FIG. 8 is a perspective view showing still another structural example of the supporting portion in the embodiment of FIG. 5.

Also, it is possible to make the rigidity comparatively low in a direction in which the supporting portion is liable to be deformed by arranging the supporting portion in a structure as shown in FIG. 8. In other words, a cut-away portion 402 is provided in a part of the leaf spring portion 401 of the supporting portion 400 and the supporting portion is arranged to be more easily deformable in the flexible direction 102 by utilizing a bent deformation in the cut-away portion. Cut-away portions 402 are formed, for example, at the end of the leaf spring portion 401 on the hinge installing portion 203 side and at the end thereof on the supporting member installing portion 205 side, respectively, to be extending along the rigid direction 101.

According to the supporting mechanism shown in FIG. 8, it is possible to make the rigidity in the more deformable direction lower with respect to the thickness of the same leaf spring portion, compared with that in the structure of the supporting portion 200 in the embodiment shown in FIG. 5. As a result, it is possible to obtain an increased degree of freedom in specific structural designing of the supporting portion.

Next, description will be made of another embodiment of a structure supporting mechanism to which the present invention is applied, with reference to FIGS. 9, 10 and 11. The basic structure of the present embodiment is the same as that of the foregoing embodiment shown in FIG. 5, except for the structure of the supporting portion. A supporting portion 500 in this embodiment has a damping mechanism for attenuating a vibration generated in the structure supporting mechanism. In the following, this difference will be described, and the description on the same components as those in the foregoing embodiment shown in FIG. 5 will be omitted.

Figure 9:
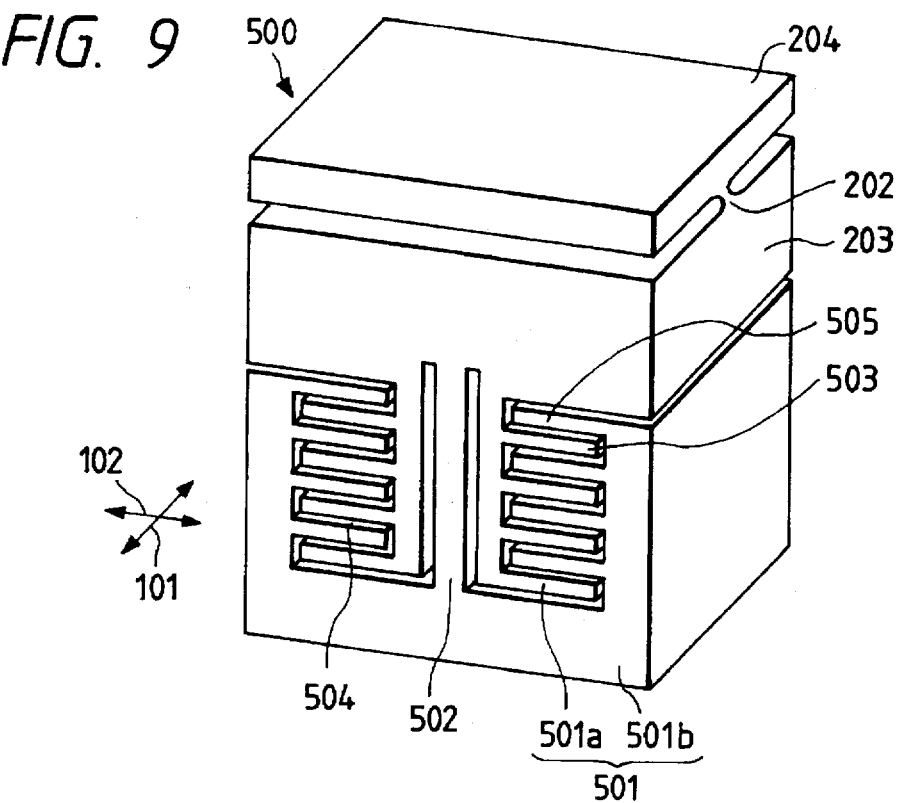
FIG. 9 is a perspective view for showing an example of the structure of the supporting portion according to still another embodiment of the present invention.

In the supporting portion 500 in this embodiment, as shown in FIG. 9, for example, a damping mechanism 501 is added to the supporting portion 200 in the foregoing embodiment of FIG. 5, as integrally formed with other components.

The damping mechanism 501 has an inner structural member 501a which consists of a plurality of leaf members 503 arranged in the form of layers on both sides of the leaf spring portion 502, and an outer structural member 501b which consists of a plurality of leaf members 505 arranged in the same layer form in such manner that they mesh with each other in a state in which layer portions of the inner structural member 501a and gaps 504 each having a predetermined size are formed.

The inner structural member 501a is connected to the hinge installing portion 203 so as to link with the upper end side of the leaf spring portion 502. The inner structural member 501a is arranged to be bilaterally symmetrical around the leaf spring portion 502 in such manner that the leaf plane of each leaf member 503 in the layer form is arranged to be oriented normally and the lengthwise direction thereof is parallel to the rigid direction 101 of the leaf spring portion 502.

The outer structural member 501b is connected to the lower end portion of the leaf spring portion 502 so as to link with the lower end side of the leaf spring portion 502, and has a plurality of leaf members 505 arranged to be bilaterally symmetrical in such a manner that layer portion consisting of the leaf member 503 of the inner structural member 501a and a gap 504 are provided to mesh with each other. The outer structural member 501b is fixed to the supporting member 11 and performs also the function of the supporting member installing portion 205 of the foregoing embodiment in FIG. 5.

Fluid or solid viscous material having a large internal loss and viscosity such as grease, silicon oil, rubber, etc., is filled in the gap 504 in order to generate the damping effect. In the present embodiment, when the supporting portion 500 is vibrated or deformed as the structural member 12, for example, is vibrated, the positional relation between the leaf member 503 and the leaf member 505 changes. With this change, a shearing stress is generated from the viscous material contained in the gap 504 in a direction to suppress a change in the positional relationship between the leaf members 503 and 505 in proportion to a relative speed between the leaf members 503 and 505. The shearing stress generated from the viscous material filled in the gap 504 can absorb and attenuate the vibration.

According to the present embodiment, there are provided layer-like portions in the inner structural member 501a and the outer structural member 501b in which they mesh with each other, and the viscous material for generating the damping effect such as grease is filled in the gap 504 which is formed between the above both portions, whereby a contact area between the viscous material and each of the leaf members 503 and 505 contained in the both members 501a and 501b can be increased. As a result, it is possible to further increase the damping effect.

Description will now be made of another structure of the supporting portion which can be used in the structure supporting mechanism of the present embodiment and has the damping mechanism, with reference to FIGS. 10 and 11. Note that FIG. 11 is a cross-sectional view of a supporting portion 600 shown in FIG. 10.

The supporting portion 600 of the present example is constituted by further adding an elastic hinge portion 601 serving as an oscillation mechanism which oscillates in the flexible direction 102 of the leaf spring portion 502 to the structure of the supporting portion 500 in FIG. 9.

Figure 10:
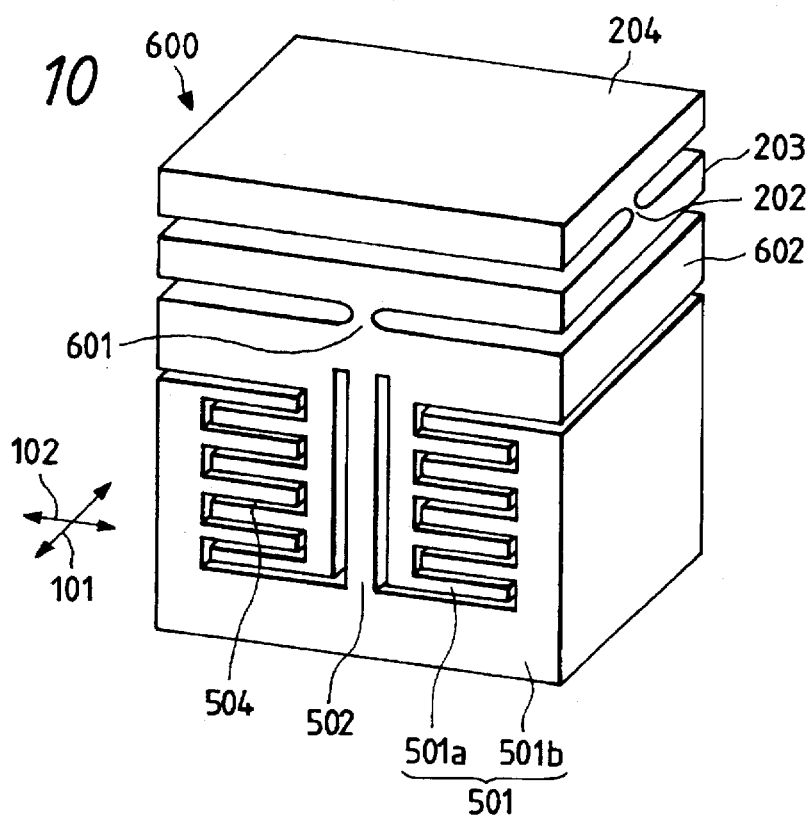
FIG. 10 is a perspective view showing another structural example of the supporting portion in the embodiment of FIG. 9.
Figure 11:
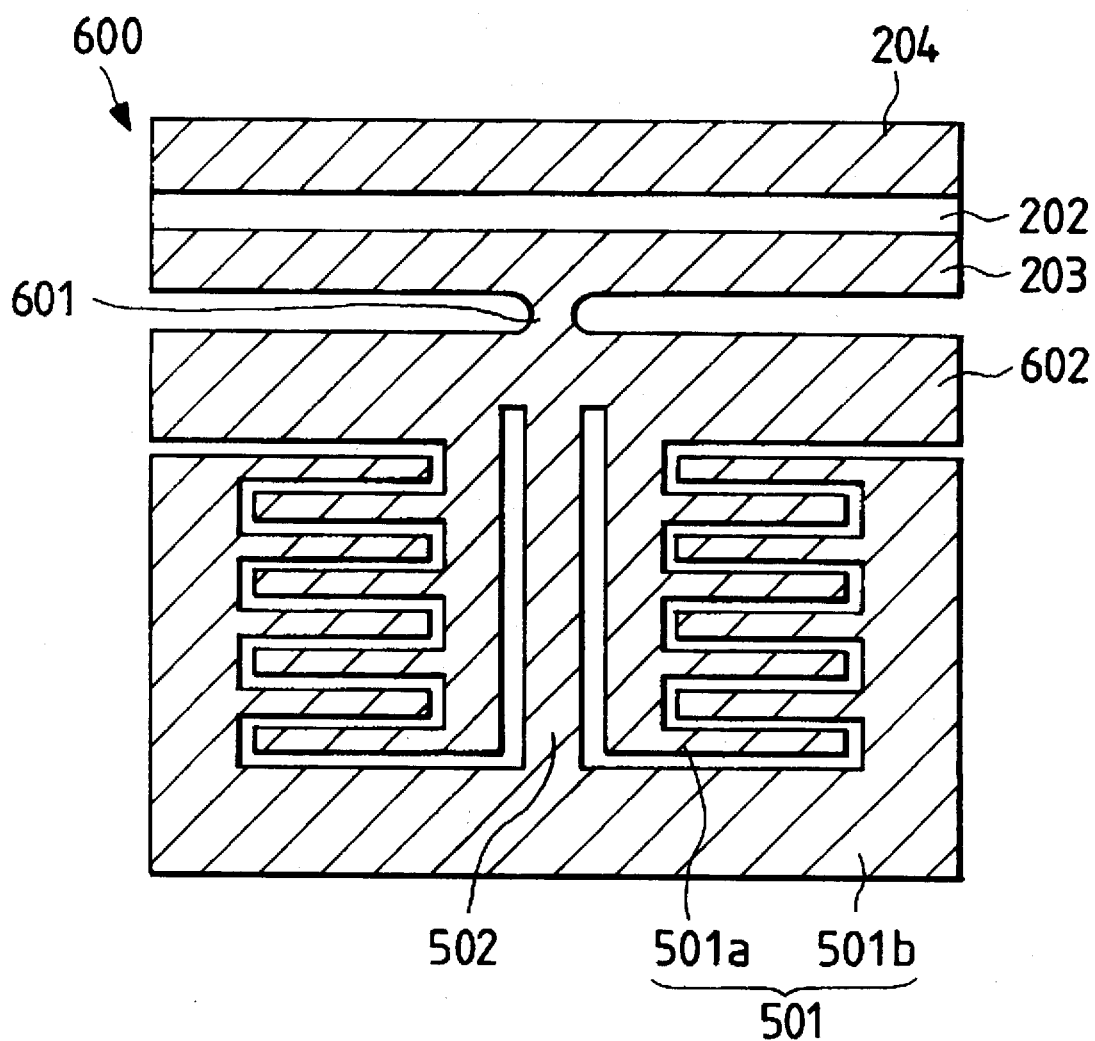
FIG. 11 is a cross-sectional view for showing the structure of the supporting portion of FIG. 10.

The elastic hinge portion 601 has the same structure as that of the aforementioned elastic hinge portion 202, and, as shown in FIGS. 10 and 11, is formed between the hinge installing portion 203 and a second hinge installing portion 602 in such manner that the axial direction thereof is parallel to the rigid direction 101 of the leaf spring portion 502. In this case, the second hinge installing portion 602 is constituted integrally with the upper end portion of the leaf spring portion 502 and the inner structural member 501a.

In the supporting portion 600 using the leaf spring portion 502, as shown in FIGS. 5 and 9, a moment is generated when the leaf spring portion 502 is thickened even in the flexible direction 102, which moment is, however, smaller than the moment in the rigid direction 101 of the leaf spring portion 502.

According to the structure of the supporting portion 600 in the present example, it is possible to prevent the influence by the moment in the flexible direction of the leaf spring portion 502 which is generated due to the deformation of the supporting member 11 from being conveyed to the structural member.

According to the present invention, it is possible to provide a supporting mechanism which does not convey a deformation of a supporting member to a structural member containing an object to be processed or machined or an object to be measured.

Further, according to the present invention, it is possible to provide a supporting mechanism as described above, which can reduce a harmful vibration without bringing about reduction in the rigidity.

It is possible to conduct measurement, machining and processing of parts which require large size and high accuracy with a high precision by supporting the structural member by utilizing the present invention. Also, it is possible to reduce the influences of external and internal vibrations so as to improve the accuracy in the processing, machining and measurement. Further, it is possible to utilize the present invention not only in the measurement, machining or processing of parts, but also in supporting of a structural member which should not be subjected to deformation.

What is claimed is:

1. A supporting mechanism comprising:

at least three supporting portions for supporting an object; and a supporting member to which said at least three supporting portions are fixed, wherein each of said supporting portions comprises:

an installing portion on which said object is installed;

a fixing portion fixed to said supporting member;

an elastic member which connects said installing portion and said fixing portion and which is able to be deformed in one direction on a plane perpendicular to a direction of a load of said object to be applied to said supporting portion;

a first oscillation mechanism for supporting said installing portion so as to allow oscillation thereof around an axis parallel to the direction in which said elastic member is able to be deformed; and a second oscillation mechanism which supports said installing portion so as to allow oscillation thereof around an axis perpendicular to the direction in which said elastic member is able to be deformed.

2. A supporting mechanism comprising:

at least three supporting portions for supporting an object; and a supporting member to which said at least three supporting portions are fixed, wherein each of said supporting portions comprises:

an installing portion on which said object is installed;

a fixing portion fixed to said supporting member;

an elastic member which connects said installing portion and said fixing portion and which is able to be deformed in one direction on a plane perpendicular to a direction of a load of said object to be applied to said supporting portion;

an oscillation mechanism for supporting said installing portion so as to allow oscillation thereof around an axis parallel to the direction in which said elastic member is able to be deformed; and a damping mechanism for attenuating vibration in said supporting portion.

3. A supporting mechanism comprising:

at least three supporting portions for supporting an object; and a supporting member to which said at least three supporting portions are fixed, wherein each of said supporting portions comprises:

an installing portion on which said object is installed;

a fixing portion fixed to said supporting member;

an elastic member which connects said installing portion and said fixing portion and which is able to be deformed in one direction on a plane perpendicular to a direction of a load of said object to be applied to said supporting portion;

an oscillation mechanism for supporting said installing portion so as to allow oscillation thereof around an axis parallel to the direction in which said elastic member is able to be deformed; and a damping mechanism for attenuating vibration in said supporting portion, and wherein said damping mechanism comprises:

a first damping member connected to said fixing portion and a second damping member connected to said oscillation mechanism, said first and second damping members being integrally formed of the same material together with the remainder of said supporting portion; and a filler filled in a gap formed between said first and second damping members, said filler including fluid or solid material for generating a shearing stress in accordance with a relative positional change between said first and second damping members due to the vibration in said supporting portion.

4. A supporting mechanism comprising:

at least three supporting portions for supporting an object; and a supporting member to which said at least three supporting portions are fixed, wherein each of said supporting portions comprises:

an installing portion on which said object is installed;

a fixing portion fixed to said supporting member;

an elastic member which connects said installing portion and said fixing portion and which is able to be deformed in one direction on a plane perpendicular to a direction of a load of said object to be applied to said supporting portion;

an oscillation mechanism for supporting said installing portion so as to allow oscillation thereof around an axis parallel to the direction in which said elastic member is able to be deformed; and a damping mechanism for attenuating vibration in said supporting portion, wherein said damping mechanism comprises:

a first damping member connected to said fixing portion and a second damping member connected to said oscillation mechanism, said first and second damping members being integrally formed of the same material together with the remainder of said supporting portion;

a filler filled in a gap formed between said first and second damping members, said filler including fluid or solid material for generating a shearing stress in accordance with a relative positional change between said first and second damping members due to the vibration in said supporting portion, and wherein said filler is either viscous fluid or rubber material.

* * * * *